Dec. 6, 1932. E. C. URQUHART 1,890,102
ARMREST ATTACHMENT FOR VEHICLE SEATS
Filed Aug. 18, 1931
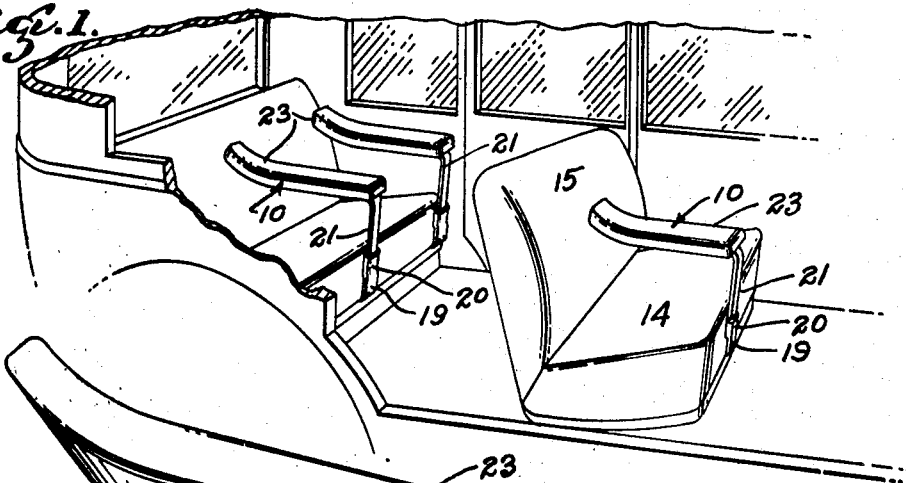
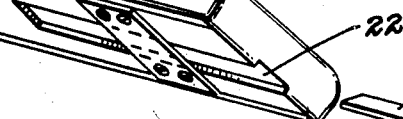
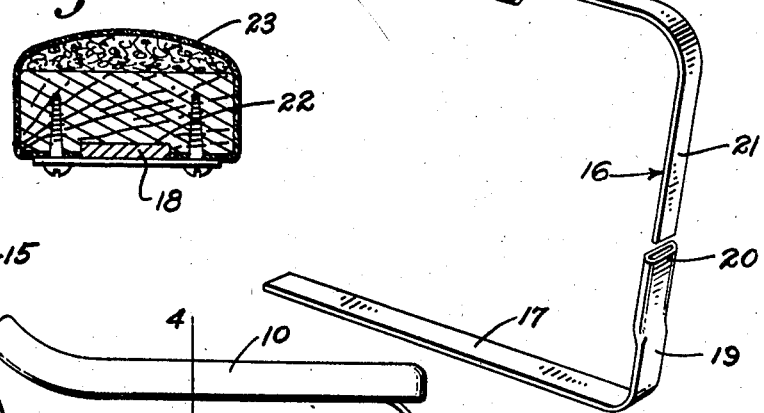
INVENTOR.
Ernest C. Urquhart
BY
Townsend, Loftus & Abbett
ATTORNEYS.

Patented Dec. 6, 1932

1,890,102

UNITED STATES PATENT OFFICE

ERNEST C. URQUHART, OF OAKLAND, CALIFORNIA

ARMREST ATTACHMENT FOR VEHICLE SEATS

Application filed August 18, 1931. Serial No. 557,787.

This application is a continuation in part of my copending application entitled "Arm rest attachment for vehicle seats", filed August 27, 1929, Ser. No. 388,707.

The invention relates to an arm rest attachment for use with seats not normally provided with arm rests.

An object of the invention is to provide a rest of the class described which is particularly designed for use with the elongated seats of automobiles and other vehicles provided for joint use by a plurality of persons.

Another object of the invention is to provide a self-supporting rest which may be operatively installed on seats having removable seat cushions without alteration or modification of the seat structure.

A further object is to provide a rest which is arranged for adjustable disposal along an elongated seat for variably dividing the seat space to fittedly accommodate the persons who are to occupy the seat.

Yet another object of the invention is to provide a rest of the class described whereby a person's arm is resiliently supported thereby.

A still further object of the invention is to provide a rest of the class described of particularly simple structure whereby marked economies in the manufacture thereof will be effected without impairing its usefulness.

The invention possesses other objects and features of advantage, some of which, with the foregoing, will be set forth or be apparent in the following description of a preferred form of the invention which is illustrated in the accompanying drawing, in which:

Fig. 1 is a fragmentary perspective view of an automobile showing rests embodying the present invention operatively installed at seats thereof. The said structure of the arm rest provides two separable approximately L-shaped sections having interfitting vertical portions at the front of the seat.

Fig. 2 is a perspective view showing the parts of the rest, said parts being separated.

Fig. 3 is an enlarged section through a seat having a rest mounted thereon in operative position.

Fig. 4 is a fragmentary section at 4—4 in Fig. 3.

Referring more particularly to the accompanying drawing, I have illustrated a rest 10 embodying the present invention for use in connection with an automobile seat such as illustrated at 11. The automobile seat is, of course, of conventional design and construction and includes the seat deck 12, the seat cushion 14 and the upholstered erect back 15. The cushion 14 is, of course, of the removable type.

The arm rest 10 comprises generally a U-shaped member 16 arranged for disposal in a vertical plane and providing a foot or base portion 17 and an arm rest supporting portion 18. The base or foot portion 17 is provided with an upturned section 19 terminating in a socket 20. The arm rest portion 18 is provided with a depending section 21, the lower terminal of which is adapted to be engaged with the socket 20 so as to connect the arm rest portion 18 and the foot or base portion 17, the vertical portions 21 and 19 forming a connecting or standard portion when joined.

The foot portion 17 is arranged for disposal and engagement between the cushion 14 and the deck 12 and is preferably wide enough to prevent an appreciable rotation thereof about its longitudinal axis when it is so engaged. By forming the base or foot portion 17 of a length to span the cavity in the seat deck 12, it is seen that the base is effective as a support at all points along the full length of the seat.

The arm rest support portion 18 is of a length to engage an outwardly opening socket 22 in the underside of the arm rest member 23. When such engagement is effected, the arm rest member 23 will be disposed horizontally as illustrated. The back of the seat prevents accidental displacement of the arm rest member from the horizontal portion of the upper L-shaped section of the arm rest. The arm rest member 23 will be held by the arm rest support member 18 in a position in parallel relation to and above the top surface of the cushion 14 at such a height that a person sitting on the cushion adjacent the rest may use the arm rest member as a rest for his arm and hand. The arm rest member 23 is approximately cushioned and upholstered for this purpose.

When the present rest is disposed for use, the standard portion formed by the portions 19 and 21 will lie closely contiguous to the front surface of the cushion.

The material and section of the metal strip from which the supporting structure comprising the members 17 and 18 is formed is such that it will have a certain resiliency and resiliently resist a certain degree of temporary deformation, and particularly a downward depression of the arm support member 23.

It should be stated that in prior practice the arm rest portion of vehicle seats are rigid with the seat and the vehicle body and hence transmit all vehicular vibrations to the forearm of a person using such rests. A forearm disposed on the arm support member 23, however, is resiliently supported in a corresponding manner to the support of the body on the seat cushions and hence does not receive the aforesaid vehicle vibrations in full strength. With the present arrangement it will be noted that the greatest displacement of the arm support member 23 is permitted at the elbow end of the forearm whereby a maximum cooperation of the cushioning effect of the rest and cushions is afforded.

For preventing too great bending stresses in the rest structure just described, the arm rest member 23 is preferably extended rearwardly and upwardly opposite the opposed face of the back seat cushion 15, which cushion slopes upwardly and rearwardly from the rearmost edge of the seat cushion 14 in such manner that the free end of the arm support member 23 will engage the back cushion 15 when depressed to an allowable extent. In this manner a permanent deformation of the rest structure is prevented and the resilient support provided by the rest is augmented under extreme conditions of use thereof. Normally the arm rest member 23 does not engage the cushion 15, the normal relation being indicated in Fig. 3.

It will now be clear that an inexpensive and particularly effective arm rest has been provided for use in the seats of vehicles, attention being particularly called to the adaptability of the device to an adjusted installation on seats of many types and uses.

It should be pointed out that if it is desired to remove the arm rest, it is not essential to remove the seat cushion 14 but only necessary to disengage the arm rest support section 18 from the socket 20 of the base section 17, leaving the base section 17 in unobstructing position beneath the cushion 14. In this manner the rests may be readily and expeditiously erected for use or detached and removed from the vehicle when desired.

Likewise, the detachable connection between the arm support member 23 and the member 18 enables these two portions to be quickly assembled or disassembled so that the devices when removed from the vehicle may be stored in a comparatively small space.

While I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

The combination with a seat having an erect back, of a substantially U-shaped member of resilient material composed of two separable approximately L-shaped upper and lower sections having horizontal and vertical portions, the vertical portions interfitting at the front of the seat and the horizontal portion of the lower section extending beneath the seat, and an arm rest member provided with an outwardly opening socket receiving the horizontal portion of the upper section, said arm rest member extending to a point adjacent the back of the seat and sufficiently close to the same so that the back of the seat will limit the downward movement of the arm rest member and at the same time prevent the arm rest member from being accidentally separated from the horizontal portion of the said upper section.

ERNEST C. URQUHART.